Feb. 7, 1967 D. G. GRABBE 3,302,270

METHOD OF WEAR-RESISTANT COATING A COMMUTATOR CONTACT SURFACE

Filed Nov. 9, 1962

INVENTOR
DIMITRY G. GRABBE

BY Charles A. Blank

ATTORNEY

United States Patent Office 3,302,270

Patented Feb. 7, 1967

3,302,270
METHOD OF WEAR-RESISTANT COATING A COMMUTATOR CONTACT SURFACE

Dimitry G. Grabbe, Sea Cliff, N.Y., assignor to Photocircuits Corporation, Glen Cove, N.Y., a corporation of New York Filed Nov. 9, 1962, Ser. No. 236,610
3 Claims. (Cl. 29—155.55)

This invention relates to electrical switches and to methods of making the same. More particularly, the invention relates to high speed electrical switches suitable for use in, for example, telemetering applications.

In telemetering applications in which a rapid sampling of a large number of conductors is made by a switch, and in which the signal levels to be sampled are small, it is important for the switch to have very low electrical resistance and to have substantially constant resistance. It is also important that the switch develop minimum electrical noise which distorts the signal passing through the switch. Assemblies generally similar to a motor commutator are attractive for switching applications due to their long, reliable mechanical life and relative simplicity of manufacture. However, switches constructed in a form similar to a motor commutator do not operate satisfactorily for switching signals at low signal levels for the following reasons.

The surface of a usual copper commutator of the prior art is coated by a film, which may be copper oxide, or by a film of some other chemical composition, depending on the environment in which the film was formed. These films are of various thicknesses, of varous densities and of differing properties depending on the type of base metal, on the nature of any additives that may be in the base metal and also depending on ambient conditions during the film formation, such as temperature or ambient gases or other chemicals on the metal surface during the film formation. For example, copper in air forms copper oxide at a very rapid rate, such as 5 angstrom units thickness in three microseconds at 20° C. The thickness of a copper oxide film formed on copper under normal operating conditions in air is approximately 200 to 500 angstrom units. The rate of oxygen diffusion through the film to the copper after the film reaches this thickness is so slow as to be negligible. The copper oxide film is a semiconductor, having rectifying properties.

When a carbon brush slides on a copper oxide film coating a copper conductor, some of the graphite particles are removed from the brush and penetrate the oxide film, embedding themselves in the film surface. Therefore, any further sliding is between one carbon layer in the body of the brush and another carbon layer embedded in the film. During operation within a selected range of brush-to-conductor pressures per unit area, the carbon particles which are embedded in the oxide film are oriented with their planes providing best sliding parallel to the film surface. By means of this orientation and with the aid of hydrodynamic lubrication of the moisture in the air, the brush and conductor have a long mechanical life and have a coefficient of friction as low as .02.

When a potential of sufficient magnitude is developed between the conductive material of the brush and the metal of the conductor, there is formed across the oxide film an electrical field which will bring about avalanche condition in the film in a manner similar to a tunnel diode. During the avalanche, electrons flow, heat is generated, and the oxide film is fractured, forming fissures or mechanical cracks. If a sufficient potential exists, such as .23 volt for copper, the copper base metal softens. At .4 volt the copper melts and is drawn electrostatically through the cracks toward the conductive brush. The copper-filled cracks are referred to as "A" spots by Dr. Ragnar Holm in his handbook "Electrical Contacts," published by Springer Ferlag, Berlin. The cross-section of the "A" spots is very small, on the order of 2 microns. Any further conduction of current is carried by a large number of such "A" spots and not through the remainder or bulk of the brush-to-conductor interface. In reality a very small portion of the apparent contact area between brush and conductor is actually conducting. Accordingly, conventional brush-to-conductor switches are subject to the disadvantages of having a high electrical resistance, having a variable electrical resistance due to the random distribution of "A" spots, and of introducing a higher noise level, due to random resistance variations, than is desirable for many applications.

Metal-to-metal switches of the prior art have a low electrical resistance but have poor wearing qualities due to undesired welding of the sliding surfaces during switch operation.

It is an object of the present invention, therefore, to provide a new and improved electrical switch which avoids one or more disadvantages of prior such switches.

It is another object of the invention to provide a new and improved electrical switch which has a low noise level and a long life.

It is another object of the invention to provide a new and improved electrical switch which has a low and a substantialy constant electrical resistance and a long life.

It is another object of the invention to provide a new and improved electrical switch which is particularly useful in high-speed switching applications at low signal levels.

It is another object of the invention to provide a new and improved method of making an electrical switch.

In accordance with the invention, an electrical switch comprises a conductor having a corrosion coating and a conductive brush in intimate contact with the coating. The brush comprises carbon and contains at least one member selected from the group consisting essentially of indium, gallium, lithium, indium compounds, gallium compounds, lithium compounds, sodium compounds, and potassium compounds.

Also in accordance with the invention, a method of making an electrical switch comprises forming a corrosion coating on a conductor and disposing in intimate contact with the coating a conductive brush comprising carbon. The method includes the step of applying to said coating at least one member selected from the group consisting essentially of indium, gallium, lithium, indium compounds, gallium compounds, lithium compounds, sodium compounds, and potassium compounds. The method also includes the step of applying a voltage across the brush and the conductor sufficient to fracture the oxide coating.

For a better understanding of the present invention, together with other and further objects thereof, reference is made to the following description, taken in connection with the accompanying drawing, and its scope will be pointed out in the appended claims.

Referring now more particularly to the drawing.

Figures 1, 2:
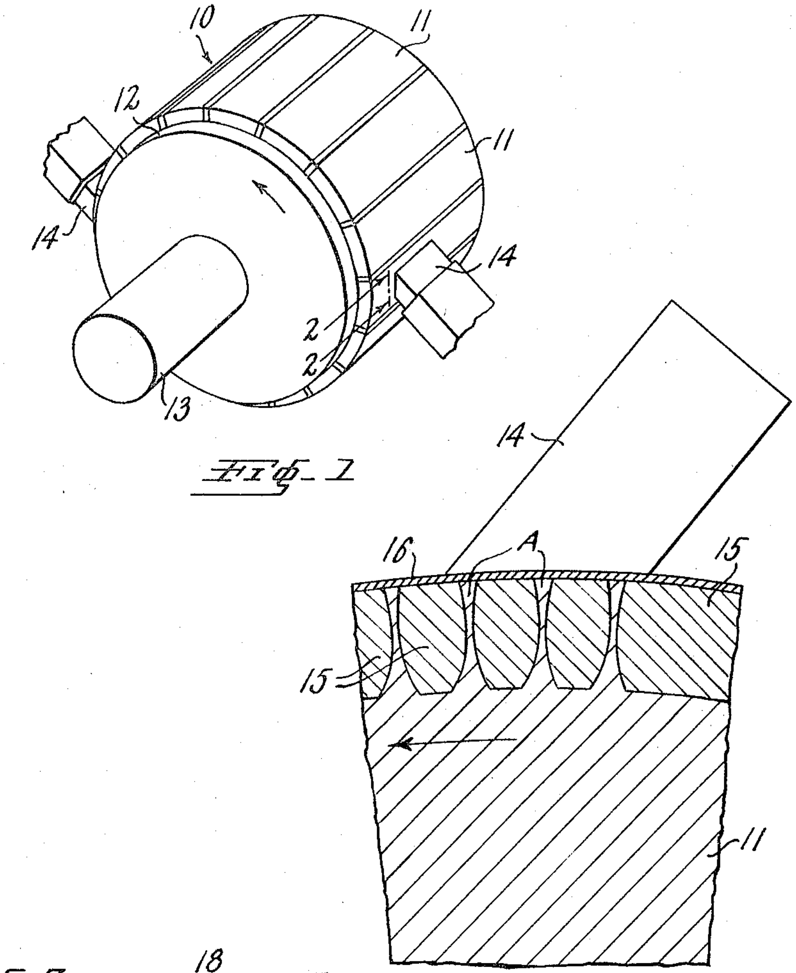
FIG. 1 is a perspective view of a cylindrical commutator switch and carbon brushes.
FIG. 2 is an enlarged, fragmentary sectional view of FIG. 1 commutator switch taken along lines 2—2 of FIG. 1.

Referring now more particularly to FIG. 1 of the drawing, an electrical switch constructed in accordance with the invention comprises a commutator 10, suitable for a tachometer generator, including a plurality of conductors 11 having a corrosion coating comprising, for example, an oxide, sulphide, sulphate, bromide or iodide coating. The conductors are mounted on suitable insulating support 12 with a central shaft 13. The conductors preferably are of a non-ferrous metal or a non-ferrous alloy such as copper or, for example, beryllium copper, silver or brass. Also suitable for the body or base material of the conductors are gold, molybdenum, palladium, and platinum. Alloys having major proportions by weight of any one or a plurality of the foregoing materials above-identified as being preferred or suitable for body material of the conductors may also be used for body material of the conductors. Copper-nickel having a major proportion by weight of copper is suitable for the body material of the conductors. Numerous other materials may also be used for the body material of the conductors, provided those materials are, for example, materials into oxides of which indium will diffuse, for reasons which will be apparent hereinafter. Preferably the conductors are copper conductors having essentially a copper oxide coating.

The commutator 10 also includes a pair of conductive brushes 14, 14 in intimate contact with the conductors 11. Each brush 14 comprises carbon and preferably contains at least one member selected from the group consisting essentially of indium, gallium, lithium, indium compounds, gallium compounds, lithium compounds, sodium compounds, and potassium compounds. The compounds may, for example, be carbonates or iodides. A preferred composition of the brush comprises carbon and at least one member selected from the group consisting essentially of indium, gallium, lithium, indium compounds, gallium compounds and lithium compounds. Another preferred brush composition comprises carbon and at least one member selected from the group consisting essentially of indium, gallium and lithium. Preferably each brush 14 comprises graphite, which may be an electro-graphitic material, and indium. Gold may be added to give lower resistance to the brush material. Molybdenum disulfide may be used as a lubricant. One suitable composition of the brush material by weight is 50% carbon graphite, 9% gold, 40% indium, and 1% molybdenum disulfide.

A long mechanical life may be provided for the switch by a thick protective oxide film on the conductors. The film may, for example, be 500 angstrom units thick. On the other hand, in order to provide satisfactory conductive contact, especially at low potentials of the order of .005 volt, an absence of an oxide film is desirable. I have discovered that an electrical breakdown of the copper oxide film over the entire surface of the film can be effected by the injection into the film of metallic atoms of indium, gallium, lithium, sodium, or potassium. This may be accomplished by rubbing a thin copper oxide film with a material selected from the group consisting essentially of indium, gallium, lithium, indium compounds, gallium compounds, lithium compounds, sodium compounds and potassium compounds. For example, lithium carbonate, gallium or indium may be rubbed onto the film. The coating then contains at least one member selected from the group consisting essentially of indium, gallium, lithium, sodium, potassium, indium compounds, gallium compounds, lithium compounds, sodium compounds and potassium compounds. The indium, gallium, lithium, sodium or potassium atoms penetrate the oxide film to only very thin depths, for example, 20 angstrom units.

The preferred method of making the switch comprises polishing a copper conductor in an oxygen atmosphere to form a thick copper oxide coating of, for example, 500 angstrom units thick. The turning of the commutator surface may be performed on an ordinary lathe, using high speed steel cutters, after which the commutating surface may be polished with a brush seating stone while rotating at a speed of approximately 1000 feet per minute. During the polishing operation oxygen is blown at the surface immediately next to the polishing stone. The oxygen treatment preferably is continued for approximately one minute after the polishing has been completed. This provides a film of known chemical composition. Other gases which will form the other corrosion coatings previously identified may be utilized in some applications. A brush having the preferred composition by weight previously mentioned is disposed in contact with the conductors at an angle of, for example, 50° and a brush pressure of, for example, 5.3 pounds per square inch, as represented in section in FIG. 2 to stabilize the brush position. The brush track preferably has a surface finish of less than 15 microinches. If desired, indium may be applied to the brush by impregnating the brush with an indium electroplating solution, for example, indium sulphamate, plating out the indium in the brush onto the carbon particles by applying a voltage of, for example, 100 volts (direct-current) across a brush of ½ inch length for two seconds to liberate the indium from the solution, and then rinsing the brush in boiling water to remove the excess salt. However, preferably indium and carbon particles are mixed and pressed to form a brush.

Thereafter, when a voltage of, for example, five volts (direct-current), is applied across the brush and the copper conductors, the thick copper oxide coating 15 of the conductors fractures in a number of places and molten copper is drawn to the surface of the copper oxide coating, as indicated in FIG. 2 at points A. The copper at points A protruding to the surface also oxidizes. However, the oxidation layer is very thin at points A and, therefore, the indium from the brush penetrates the oxidation layer at points A causing low potential breakdown of the oxidation layer at, for example, .005 volt. The indium penetrates the outer layer 16 of the oxidation coating 15 to a depth of, for example, 20 angstrom units, over the entire surface of the conductor. The entire conductor surface is therefore, conductively connected by the indium-impregnated outer layer 16 and the copper at points A to the copper body of the conductor under the oxide coating. Therefore, a substantially constant and low resistance is maintained between the brush and the conductor for all positions of the brush on the conductor surface. Accordingly, high conduction at low noise level is provided while the thick copper oxide film over the major portion of the conductors supports the embedded carbon particles and the mechanical load of the sliding brush. The injection of indium into the conductors occurs continuously during operation, because the supply of the injected indium is drawn from the body of the brush. A complex compound of indium and copper oxide forms in the layer 16.

Figure 3:
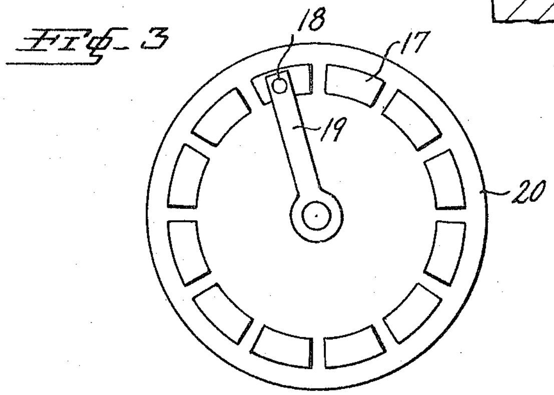
FIG. 3 is a plan view of a rotary switch with a brush suitable for telemetering applications.

Another type of switch constructed in accordance with the invention is represented in FIG. 3. The FIG. 3 embodiment is a rotary switch suitable for telemetering applications and may be constructed in a manner similar to the FIG. 1 switch, utilizing copper conductors 17 and a brush 18 preferably of the composition mentioned in connection with the FIG. 1 commutator, namely, 50% carbon graphite, 9% gold, 40% indium, 1% molybdenum disulphide. The brush 18 is mounted on a rotatable arm 19, and the copper conductors are mounted on a suitable insulating base 20.

From the foregoing description it will be apparent that an electrical switch constructed in accordance with the invention has the substantial advantages of providing good conduction with low electrical noise level and having a long mechanical life. For example, at a potential of .005 volt there is no measurable variation in current magnitude when the direction of the applied voltage is reversed. Satisfactory results have been obtained at speeds as high as 6000 surface feet per minute. Switch life in excess of 10,000 hours can be obtained.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A method of making a commutator of long mechanical life and high conduction at a low noise level particularly at low potentials as of the order of 0.005 volt comprising: forming a commutator having clean segments; forming an oxide coating of predetermined thickness on said segments by flame heating; disposing in intimate contact with said coating so at to have relative movement a conductive brush comprising carbon and containing indium; and forming a thinner outer coating conductively connected to said segments for high conduction at a low noise level, by moving said segments and brush relative to one another to apply said indium contained in said brush to said oxide coating, and applying a voltage across said brush and said segment sufficient to fracture said oxide coating and cause segment material to be drawn through said fractures to the surface of said oxide coating to be in direct contact with said indium and form therewith said thinner outer conductor coating.

2. The method of making a commutator set forth in claim 1 wherein commutator segments essentially consist of copper.

3. The method set forth in claim 2 wherein the commutator segments move relative to said conductive brush.

References Cited by the Examiner

UNITED STATES PATENTS

| | | | |
|---|---|---|---|
| 2,197,115 | 4/1940 | Randolph et al. | 148—6.31 |
| 2,699,597 | 1/1955 | Arms | 29—155.55 |
| 2,717,296 | 9/1955 | Foley et al. | 200—166 |
| 2,750,308 | 6/1956 | Burchfield | 310—228 |
| 2,777,081 | 1/1957 | Miner | 310—228 |
| 2,860,076 | 11/1958 | Smisko | 117—228 XR |
| 2,890,314 | 6/1959 | Romer et al. | 200—166 |
| 2,931,876 | 4/1960 | Weinfurt | 200—166 |
| 2,932,880 | 4/1960 | Gellatly et al. | 29—155.55 |
| 3,119,171 | 1/1964 | Anderson | 29—155.55 |
| 3,191,852 | 6/1965 | Kaatz et al. | 117—228 XR |

JOHN F. CAMPBELL, *Primary Examiner.*

BERNARD A. GILHEANY, H. O. JONES, R. W. CHURCH, *Assistant Examiners.*